Aug. 24, 1954

C. F. CARTER 2,687,145

PILOT CONTROLLED PRESSURE AND VACUUM
OPERATED PNEUMATIC VALVE

Filed Feb. 15, 1952

INVENTOR.
Clarence F. Carter
BY
Burns, Doane & Benedict
ATTORNEYS

Patented Aug. 24, 1954

2,687,145

UNITED STATES PATENT OFFICE 2,687,145

PILOT CONTROLLED PRESSURE AND VACUUM OPERATED PNEUMATIC VALVE

Clarence F. Carter, Danville, Ill.

Application February 15, 1952, Serial No. 271,748

1 Claim. (Cl. 137—599)

This invention relates to a novel, rapid acting pneumatic valve, useful in lines or orifices through which powders or fine granules flow, and particularly in hopper outlets of vacuum filling machines.

Machines for filling bags, boxes, cartons and the like, with powders, may require shutoff valves to prevent spillage or "drip" of the powder from hopper outlets or filling heads during replacement of filled containers by empties. This is especially true when the opening from the hopper to the container is too large for the powder to bridge over the opening. Mechanical valves are susceptible to wear of moving parts, and imperfect operation for this and other reasons. Moving parts generally require lubrication, and the lubricant may contaminate the powder. The present invention eliminates moving parts which require lubrication, and insures more uniform and trouble-free operation.

Figure 1:
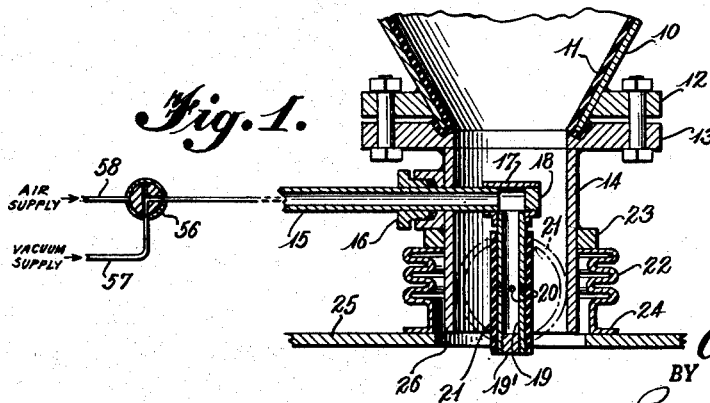
Figure 1 is a vertical section of one form of cutoff valve.

Referring to Figure 1, 10 is a hopper which may be lined with rubber or other resistant coating 11. Attached to the hopper by flanges 12 and 13 is a valve having cylindrical body 14. An air-vacuum line 15 extends through the body wall 14 through an appropriate fitting such as a compression fitting, 16. Located centrally in the cylinder, and attached by a threaded fiting to air line 15, is a T 17, plugged at one end by plug 18. A tube 19, plugged at 19', and having perforations 20, extends downwardly from the T 17. Surrounding tube 19 is a close fitting rubber tube 21. This is firmly attached to tube 19 at each end of tube 21, by any known means, but is unattached intermediate the ends. A flexible coupling 22 is attached by means of flange 23 to cylinder 14. The flanged end 24 of the flexible coupling 22 may rest against or be clamped to the top of a vessel or hopper 25 (only a part of which is shown), into which powder from hopper 10 is to be discharged. An opening 26 in vessel 25 is oriented with the lower opening of the valve.

In operation, air pressure is supplied through line 15, T 17, tube 19, and perforations 20, causing the rubber tube 21 to expand into the position shown by the dotted lines, thus quickly and effectively closing the opening in cylinder 14 and cutting off powder flow. Line 58 leads to an air supply. To supply air, three-way valve 56 is turned one half-turn counter-clockwise.

When the valve is to be opened, vacuum is pulled through line 57, three-way valve 56, and line 15, quickly collapsing the tube 21 against tube 19, thus furnishing an unobstructed annular opening through the valve body. Unless the tube 21 is deflated by application of vacuum, it may wrinkle or fail to collapse entirely or evenly, thus partially obstructing powder flow. The three-way valve may be of the solenoid type.

When the rubber sleeve 21 begins to wear or fails, it can be quickly replaced by a piece of ordinary rubber tubing, which may be natural or synthetic.

Figure 4:
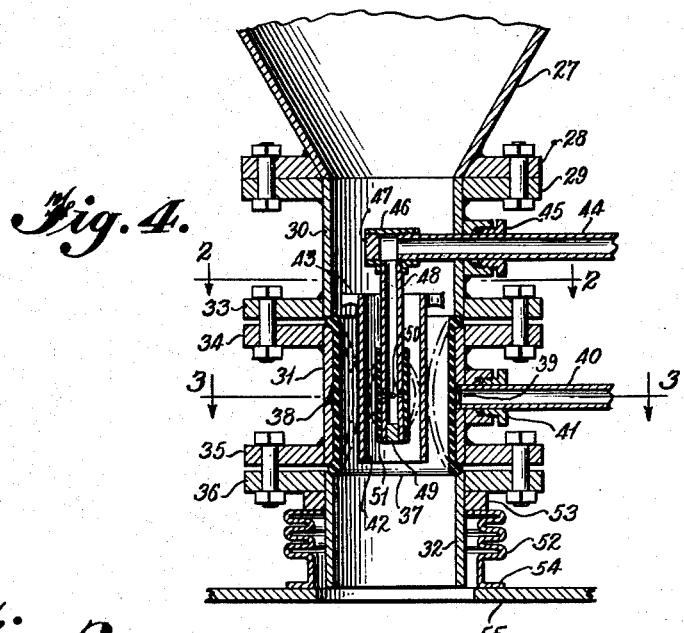
Figure 4 is a vertical section of one form of a dual action valve.
Figures 2, 3:
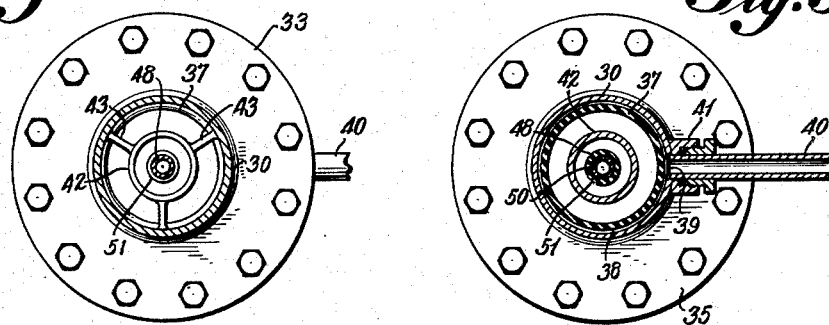
Figure 2 is a plan view along lines 2—2.
Figure 3 is a plan view along lines 3—3.

Figure 4 represents a modification of the valve particularly useful for supplying powder to a weighing hopper or a vessel to which accurately weighed amounts of powder is to be supplied.

The valve is mounted on hopper 27 by flanges 28 and 29. The body is cylindrical and is shown as made up of three sections, 30, 31 and 32, held together by flanges 33, 34, 35 and 36. A rubber sleeve 37 lines the central section 31, being held in place terminally by flanges 33, 34, 35, and 36, which pinch the ends of the tube. The tube may be beaded as shown. Otherwise the sleeve is unattached. Section 31 is circumferentially grooved at 38. An aperture coincides with air-vacuum line 40 held in place by the compression fitting 41. Centrally of the cylindrical body is a smaller cylinder 42, supported by spider 43 or any other suitable means. An air-vacuum line extends through cylinder 30 through compression fitting 45 to T 46, which is plugged at 47. A tube 48 extends from T 46 well into tube 42. This is plugged at 49 and perforated at 50. A rubber sleeve 51 fits over the lower portion of the tube 48 and may be terminally cemented or otherwise attached thereto. As in the modification shown in Figure 1, a flexible connection 52 is attached at 53 to section 32. Flange 54 rests on or is clamped to the apertured weighing hopper or vessel 55, only a portion of the top of which is shown.

A diagrammatic representation of a three-way valve 56 connected to vacuum supply line 57 and air supply line 58, is shown in Figure 1. Similar arrangements are used in connection with lines 40 and 44 of Figure 4.

The valve shown in Figure 1 is particularly useful in connection with vacuum type filling machines wherein a powder is pulled by vacuum from a hopper into a vessel or container and wherein accurate weights of material are to be supplied.

In operation, when the valve is open, vacuum is applied to both lines 40 and 44. This causes the rubber sleeves 37 and 51 to be pulled firmly and uniformly against cylinder 31 and tube 48 respectively, leaving substantially unobstructed annular passages through the valve. When vessel 55 is evacuated, the powder from hopper 27 flows through both annular passageways. The passageway between cylinder 31 and tube 42, being the larger, supplies the major portion of the powder into the vessel. Flow is continued until the weight of material in the vessel is just short of that desired. At this time, air pressure is applied through line 40, which causes the rubber liner 37 to inflate to the position shown by the dotted lines, thus effectively and instantaneously closing that passage to the further flow of powder. Powder continues to flow at a much diminished rate through the annular passageway between tubes 42 and 48. When the desired weight of material has entered the vessel 55, air pressure is applied to tube 44, which causes the rubber sleeve 51 to inflate and close the passage to further flow of powder. If a container is being filled, it is then removed and another substituted. As soon as it is in place, vacuum is again applied to both lines 40 and 44, and the operation is repeated. If vessel 55 is a weighing hopper, the weighed charge is removed therefrom, and the cycle is then repeated. This has the advantage of permitting extremely rapid filling of the container with the major part of the powder to be added, followed by the slow addition of powder through the smaller passageway so that an accurate weight can be obtained.

By eliminating tubes 42, 44, 48 and 51, the valve shown in Figure 4 can be used as a cutoff valve, serving the same purpose as the valve shown in Figure 1. The modification shown in Figure 1, however, is generally the more efficient.

It will be noted that the rubber sleeves 21, 37 and 51 are of substantially uniform wall thickness. This is generally about the thickness employed for standard rubber tubing used in the laboratory and for other purposes. Extra heavy tubing can be used, particularly in the larger sizes.

I claim as my invention:

A pneumatic valve for controlling the flow of particles, which comprises a body having a cylindrical passageway therethrough, a first inflatable sleeve sealingly attached at each end to the body to cover the wall of said passageway intermediate its length, a first air-vacuum supply line extending through the wall of said body and opening between the wall and the sleeve, a first tube mounted coaxially within said body and spaced from the wall of the passageway, thereby forming an annular passage between said sleeve and said first tube, a perforated tube of smaller diameter than said first tube mounted coaxially of said first tube, a second inflatable sleeve sealingly attached at each end to said second tube to cover the perforations therein, intermediate the length of the second sleeve, a second air-vacuum line communicating with said second tube at one end thereof, the opposite end being sealed.

References Cited in the file of this patent

UNITED STATES PATENTS

| Number | Name | Date |
| --- | --- | --- |
| 1,873,138 | Mitchell | Aug. 23, 1932 |
| 1,924,425 | Wickersham et al. | Aug. 29, 1933 |
| 2,353,143 | Bryant | July 11, 1944 |
| 2,371,434 | Eppler | Mar. 13, 1945 |
| 2,470,744 | Korn | May 17, 1949 |
| 2,564,198 | Elkins | Aug. 14, 1951 |
| 2,575,240 | Thompson | Nov. 13, 1951 |

FOREIGN PATENTS

| Number | Country | Date |
| --- | --- | --- |
| 617,183 | Great Britain | Feb. 2, 1949 |
| 258,092 | Switzerland | Apr. 16, 1949 |